US005970455A

United States Patent [19]
Wilcox et al.

[11] Patent Number: 5,970,455
[45] Date of Patent: Oct. 19, 1999

[54] SYSTEM FOR CAPTURING AND RETRIEVING AUDIO DATA AND CORRESPONDING HAND-WRITTEN NOTES

[75] Inventors: Lynn D. Wilcox, Portola Valley; William N. Schilit, Palo Alto, both of Calif.; Nitin Sawhney, Cambridge, Mass.; Joseph W. Sullivan, Portola Valley; Timothy W. Bickmore, Sacramento, both of Calif.

[73] Assignees: Xerox Corporation, Stamford, Conn.; Fuji Xerox Co., Ltd., Tokyo, Japan

[21] Appl. No.: 08/821,311

[22] Filed: Mar. 20, 1997

[51] Int. Cl.$^6$ .................................................. G10L 3/00
[52] U.S. Cl. ............................................ 704/270; 704/278
[58] Field of Search ................................... 704/260, 270, 704/275–278; 345/326; 707/200, 500, 501, 530

[56] References Cited

U.S. PATENT DOCUMENTS

| | | | |
|---|---|---|---|
| 4,627,001 | 12/1986 | Stapleford et al. | 704/260 |
| 4,841,387 | 6/1989 | Rindfuss | 360/72.1 |
| 5,477,511 | 12/1995 | Englehardt | 704/251 |
| 5,500,920 | 3/1996 | Kupiec . | |
| 5,539,427 | 7/1996 | Bricklin et al. | 345/118 |
| 5,561,446 | 10/1996 | Montlick | 345/173 |
| 5,564,005 | 10/1996 | Weber et al. | 345/326 |
| 5,572,728 | 11/1996 | Tada et al. | 707/200 |
| 5,598,507 | 1/1997 | Kimber et al. | 704/246 |

FOREIGN PATENT DOCUMENTS

| | | | |
|---|---|---|---|
| 0 440 812 | 8/1991 | European Pat. Off. | G06F 3/033 |
| 0 495 612 | 7/1992 | European Pat. Off. | G06F 15/02 |
| 0 686 931 | 12/1995 | European Pat. Off. | G06K 9/22 |

OTHER PUBLICATIONS

Lu, "A Small Revelation" (Review of the Apple Newton), MacWorld Magazine, Sep. 1993, pp. 102–106.

Thomas et al., "Diamond: A Multimedia Message System Built on a Distributed Architecture", IEEE Computer Magazine, pp. 65–77, Dec. 1985.

M. Lamming et al.; "Activity–based Retrieval Technology in Support of Personal Memory" Rank Xerox EuroPARC 1991, pp. 1–16.

L. Stifelman, Augmenting Real–World Objects: A Paper–Based Audio Notebook:; CHI 96, Apr. 13–18 p. 199.

S. Whittaker et al., "Filochat: Handwritten Notes Provide Access to Recorded Conversations," Human Factors in Computing Systems, Boston, Massachusetts USA, Apr. 24–28, 1994 pp. 271–277.

K. Weber et al.; "Marquee: A Tool for Real–Time Video Logging", Xerox Palo Alto Research Center, ACM Conference, 1994, pp. 1–7.

G. Abowd et al.; "Classroom 2000: Enhancing Classroom Interaction and Review", GVU Center, College of Computing, CSCW '96 conference, 1996, pp. 1–9.

E. Pedersen et al.; "Tivoli: An Electronic Whiteboard for Informal Workgroup Meetings", INTERCHI 93, Apr. 24–29, 1993, pp. 391–398.

L. Wilcox, et al.; "Audio Indexing using Speaker Identification", Xerox Palo Alto Research Center, p. 3 aha! software products, 1995, 1996.

D. Hindus et al., "Capturing, Structuring, and Representing Ubiquitous Audio", ACM Transactions on Information Systems, vol. 11, No. 4, Oct. 1993, pp. 377–400.

*Primary Examiner*—David D. Knepper
*Attorney, Agent, or Firm*—Oliff & Berridge, PLC

[57] ABSTRACT

An electronic notebook assigns properties to digital ink of note marks and keywords to digital pages. The properties indicate the type of note mark and the keywords indicate general content of the note marks on a digital page. The notebook also synchronizes audio data with the note marks and permits audio highlighting. The electronic notebook provides an updatable database of note marks and audio that is capable of being searched based on the properties, keywords, and audio highlights.

23 Claims, 6 Drawing Sheets

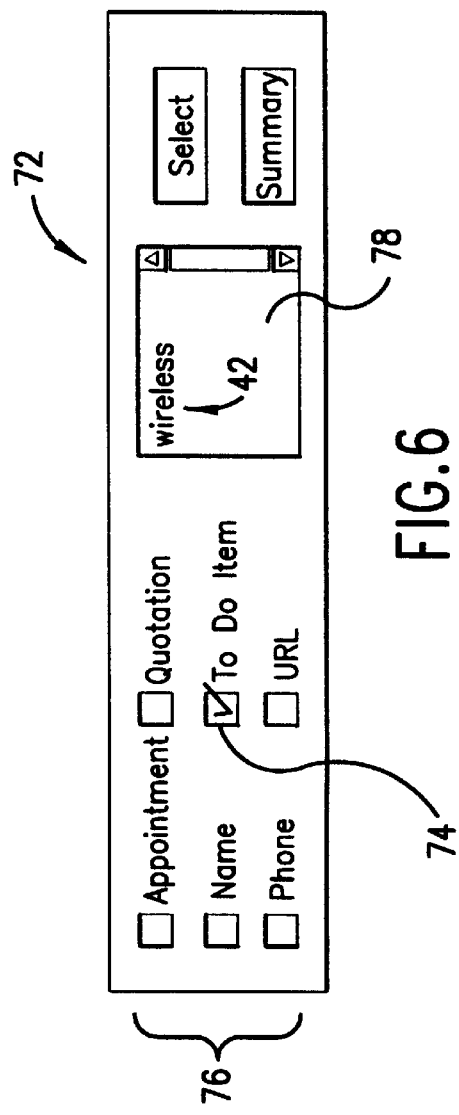

SYSTEM FOR CAPTURING AND RETRIEVING AUDIO DATA AND CORRESPONDING HAND-WRITTEN NOTES

BACKGROUND OF THE INVENTION

1. Field of the Invention

This invention is directed to a system for capturing and retrieving audio data and corresponding hand-written notes. In particular, the invention is directed to an electronic notebook that improves the way users record, review, retrieve and reuse notes and related audio data.

2. Description of Related Art

Note-taking is practiced by most information workers, including scientists, executives and students. Reasons for note-taking vary. Students take notes in the classroom and review them later to prepare for exams. Scientists write notes in lab books to record experimental results. Executives take notes in meetings to record action items. Most workers consider notes to have some historical value.

Some workers use lap-tops or Personal Digital Assistants (PDAs) for note-taking, but the majority of people use paper notebooks. Paper notebooks provide greater freedom of expression due to their free-form input as opposed to a structured keyboard input. On the other hand, paper notebooks are hard to organize by topic, particularly the bound or spiral types that are commonly used. It is also difficult to find specific information in bound notebooks, since only a manual, linear search is possible. Finally, while paper notebooks are easy to carry and use, they are not integrated with digital data.

Several systems have been designed for real-time note-taking or annotation of previously recorded audio or video.

Marquee by Karon Weber and Alex Poon is a tool for annotating video with hand-written notes and keywords. Notes are synchronized to the video by creating time zones using a horizontal line gesture. Keywords are defined by circling words in notes, and are applied to regions by a corresponding keyword region. Keywords are manually converted to text for subsequent indexing.

Filochat by Steve Whittaker, Patrick Hyland and Myrtle Wiley is a note-taking system in which audio is recorded and indexed by hand-written notes. A header for each new section of notes is automatically generated. Each header contains the time and date as well as a region in which to write topics and names. Audio is accessed by selecting a seek option and gesturing at notes.

Classroom 2000 by Gregory Abowd, Chris Atkeson, Ami Feinstein, Yusuf Goolamabbas, Cindy Hmelo, Scott Register, Nitin Sawhney and Mikiya Tani is a system for combining a classroom lecture, previously made visual materials for the lecture, and hand-written notes. The audio for the lecture is recorded and indexed by viewgraph. Hand-written notes are made on a digital overlay of the viewgraph. Retrieval of notes is done by searching text in the viewgraphs.

The Paper-Based Audio Notebook by Lisa Stifelman allows a user to capture and access an audio recording using notes written on paper. The audio recording is synchronized to each page of hand-written notes, and audio playback can be initiated by either pointing at notes or by using an audio scrollbar.

EPO Publication 0 495 612 A2 entitled "A Data Access System", Michael G. Lamming, published Jul. 22, 1992 describes a note-taking system based on a notepad computer with an integrated audio/video recorder. As the user types on the keyboard or writes with the stylus or similar input instrument on the notepad computer, each character or stroke that is input by the user is invisibly time-stamped by the computer. This activity results in the creation of meeting "notes". The audio/video stream is also continuously time-stamped during recording. When playback is desired, the meeting notes as finally created are presented to the user. To play a section of recording back, the user selects part of the note (perhaps by circling it with a stylus) and invokes a "playback selection" command. The computer then examines the time-stamp and "winds" the record to the corresponding place in the audio/video recording, where it starts playing—so that the user hears and/or sees what was being recorded at the instant the selected text or strokes were input. With a graphical user interface, the user may input key "topic" words and subsequently place check marks by the appropriate word as the conversation topic veers into that neighborhood.

Tivoli by Elin Pederson, Kim McCall, Thomas Moran, and Frank Halasz simulates whiteboard functionality on a Liveboard. Editing functions such as insertion and deletion are controlled by gestures.

The Meeting Capture System records audio synchronously with notes taken on a Liveboard. Audio playback is initiated by gesturing at Liveboard notes, or using an audio timeline.

Audio segmentation by Lynn Wilcox, Don Kimber and Francine Chen defines a means for separating speakers and sound in real-time or in recorded audio. The segments corresponding to different speakers are displayed on an audio timeline using different color bands or separate timelines for each speaker.

Listener by Debby Hindus, Chris Schmandt and Chris Horner is a system which displays the structure of a phone conversation and allows the user to save selected speaker comments.

These systems have proposed various approaches to solving the need for properly organized and searchable hand-written notes and related audio data. However, none have met the need effectively.

SUMMARY OF THE INVENTION

The present invention is an electronic notebook designed to improve the way users record, review, retrieve and reuse their personal notes. The present invention includes an interface that is similar to a standard paper notebook, that is, the user enters freeform hand-written notes onto a screen having the appearance of a page in a traditional notebook. However, the present invention has features that augment standard note-taking capabilities. First, the present invention allows properties such as "action item" or "name" to be associated with the digital ink so that notes with these properties may be more easily retrieved. Second, in order to further aid indexing, the present invention allows the user to assign text keywords to a page of notes. Finally, audio is recorded and synchronized with the digital ink, but only those portions of the audio highlighted by the user are stored permanently.

These features of the present invention provide the ability to have multiple views on a notebook, analogous to a database system. For example, requesting notes from last week with the property "action item" and keywords "mobile" and "computing" would cause the notebook to display only those notes from the previous week which were marked as action items and which were on the topic of mobile computing. Once notebook views are defined they may be reused, thus providing the user with dynamic organization of the changing content of the notebook.

In the present invention the set of properties associated with digital ink may include standard categories such as "action item", "name", "calendar item", and "URL", as well as other user defined properties. Properties are used to indicate the type of information expressed by the digital ink. Properties are indicated to the user by ink color or icon and are used to retrieve from the notebook only those note marks of interest, i.e., those notes with a specified property.

Properties are set for digital ink by either selecting a property before making the note, or by selecting the desired note marks after writing and applying the desired property to the digital ink comprising the note marks. Alternately, the note page can be structured so that the digital ink of note marks in predefined regions are automatically assigned the properties for that region. For example, a note page template for meetings may have a region at the top of the page for attendees. The digital ink of note marks in that region would be assigned the property "attendees".

The present invention also allows the user to associate text keywords with a page of notes, to indicate the topic content of the digital ink on the page. Text keywords can be entered in a number of ways, including typing, selecting from a keyword list, or by interacting with a handwriting recognizer. The present invention may select note marks that correspond to the desired keyword and attach the "keyword" property. Digital ink with the property "keyword" is then recognized with the handwriting recognizer and then entered as a keyword into a keyword list.

The present invention also provides the ability to highlight portions of audio and to modify the highlighted portions. Audio highlighting is initiated using a button or gesture, and the fixed duration of the highlight can be extended by a button click or gesture. Highlighted audio is indicated to the user by displaying in bold those note marks made during the audio highlighting, and as bars on an audio time line. While many systems record audio and note marks synchronously, they assume that the entire audio recording will be stored permanently. By contrast, the present invention continuously records audio but stores only those portions of the audio that are highlighted by the user. This significantly reduces the amount of storage required for the audio data which is extremely important for a portable device.

Alternatively, the present invention can store the entire audio recording but use a low bit rate compression technique such as LPC to store audio data that is not highlighted.

Highlighted portions can be modified after recording by editing the time line.

During the editing process, playback is modified to distinguish between highlighted and non-highlighted audio portions. The present invention does this in a number of ways, such as by modifying the volume so that the highlighted portions are louder, by modifying the playback rate so that the highlighted portions are slower, by adding noise to non-highlighted audio, or by adding reverb to the highlighted audio portions.

The present invention also provides continuous speaker identification of the notebook's owner or other speakers. Given suitable training, this provides the capability to automatically highlight audio portions based on identification of speakers.

The present invention also uses multiple views of a notebook based on the indices generated by searches that indicate desired properties, keywords and/or time stamps.

While other systems provide keyword based retrieval for content, the present invention additionally allows retrieval based on information type. For example, the present invention can display only the note marks that have digital ink with the "action item" property, or only those note marks on digital pages that have specific keywords. This allows the user to quickly view only those note marks that are the relevant information type.

BRIEF DESCRIPTION OF THE DRAWINGS

The preferred embodiments of the invention will be discussed in detail with reference to the following figures, wherein:

FIG. 5 is an illustration of a sample table of contents;

FIG. 6 is an illustration of a sample retrieval toolbar; and

DETAILED DESCRIPTION OF PREFERRED EMBODIMENTS

The present invention is a system for capturing and retrieving hand-written and audio notes. The input to the system includes digital ink, annotations to the ink such as keywords and properties, audio recording, and gestures for controlling this input.

Figure 1:
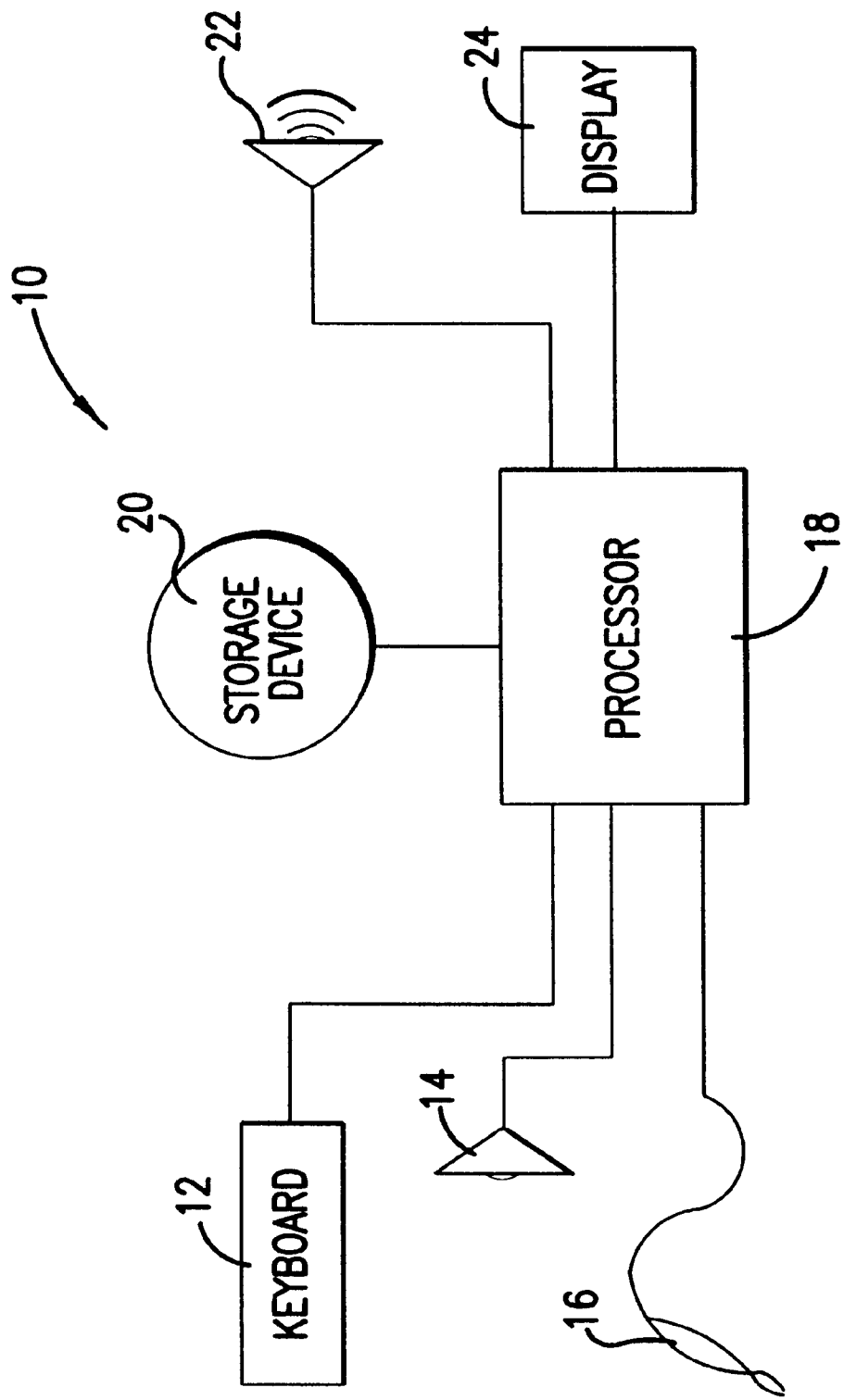
FIG. 1 is a block diagram of the components of the system of the present invention.

FIG. 1 is a block diagram of the components of the system 10 of the present invention. Input devices can include a keyboard 12, a microphone 14 and a pen 16. The processor 18 receives data from the input devices and controls a storage device 20, speaker 22 and display 24.

Figure 2:
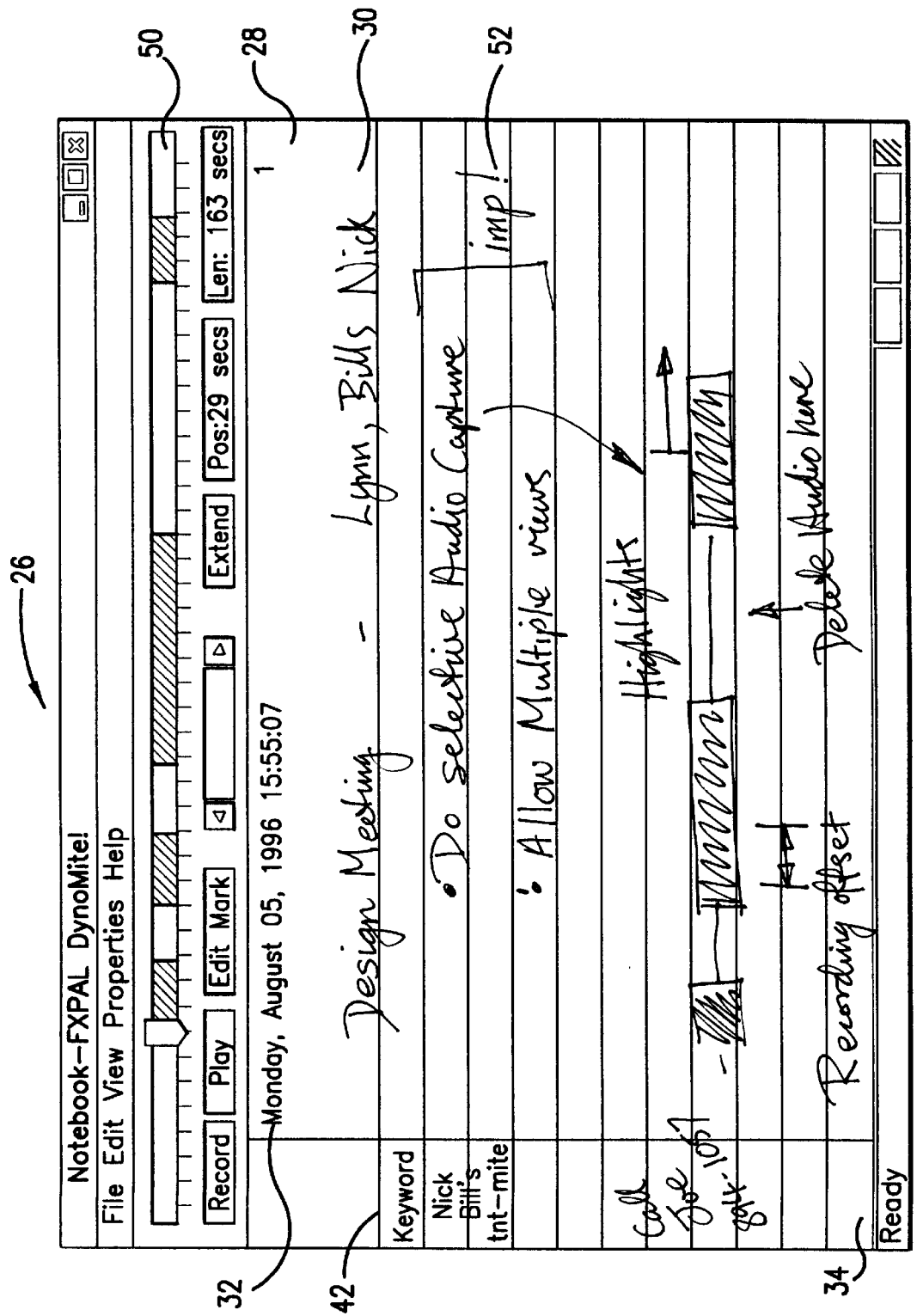
FIG. 2 is an illustration of a sample interface of the present invention showing a screen that resembles a paper-based notebook page.

FIG. 2 shows a screen 26 with an example digital page 28. Note marks 30 entered on a page of notes are stored in a structure that includes their time stamp and any associated properties. The size of the digital page 28 is defined by the user and an unlimited amount of space is available by scrolling the digital page and requesting new pages. Dates 32 are associated with each page.

The background 34 for a digital page 28 can be selected by the user according to his preference or according to the task at hand. The example background 34 shown in FIG. 1 emulates a paper-based lined page with left margins. Other sample backgrounds include plain white pages or other form-based pages that have predefined areas for specific information, such as names or Uniform Resource Locators (URLs).

Note marks 30 are clustered by time, so that marks created sequentially without a pause are grouped together on a digital page.

Several gestures are available to assist with the input. A horizontal line gesture causes a new page to be created. An insertion gesture creates more space above and below the point of insertion. A delete gesture deletes the last group of note marks, and an undo gesture repeatedly reverses the last change. Additionally, note marks can be selected individually or as groups and may be dragged to other locations on the digital page.

The present invention allows the user to indicate the type of information contained in note marks by attaching properties to the digital ink of those note marks. Properties indicate information types that are associated with selected digital ink. Properties are associated with the digital ink and not the entire digital page so that the individual note marks can easily be identified on the page and viewed. Note marks with digital ink having a specific property from a number of digital pages can be viewed at once. Properties are useful for retrieval because they are a low overhead categorization that can be used to distinguish between note marks.

The present invention has a fixed set of default properties, that include various categories: "action item", to indicate that the note mark is a reminder for the user to perform a particular task; "name", to indicate that the note mark is a name of a person; "calendar item", to indicate that the note mark refers to an appointment for a specific time; and "URL", to indicate that the note mark is an HTTP address. In addition to the default properties, the user can add other properties. For example, the user may want to add a property such as "ideas", for the note marks that refer to ideas for future work, or "expenses", for note marks about business expenses.

Properties can be assigned to the digital ink in the note marks either before or after the note mark is written. If the user knows beforehand that what is about to be written has a certain property, the user can select that property from the menu, assign it to the digital ink and begin writing. Note marks having different properties are distinguished from each other by the color of the digital ink. For example, note marks having digital ink without properties may be black while note marks having digital ink with "action item" as an assigned property may be green.

Properties can be attached to digital ink of groups of note marks after they have been created in two ways. In one, the user clicks near a note mark and all note marks in its group are selected. The property menu can then be used to add the desired property to the digital ink in the group of note marks. Alternately, a group of note marks can be selected by using a lasso gesture or by dragging a rectangle around the selected note marks, and attaching the property as before.

Figure 3:
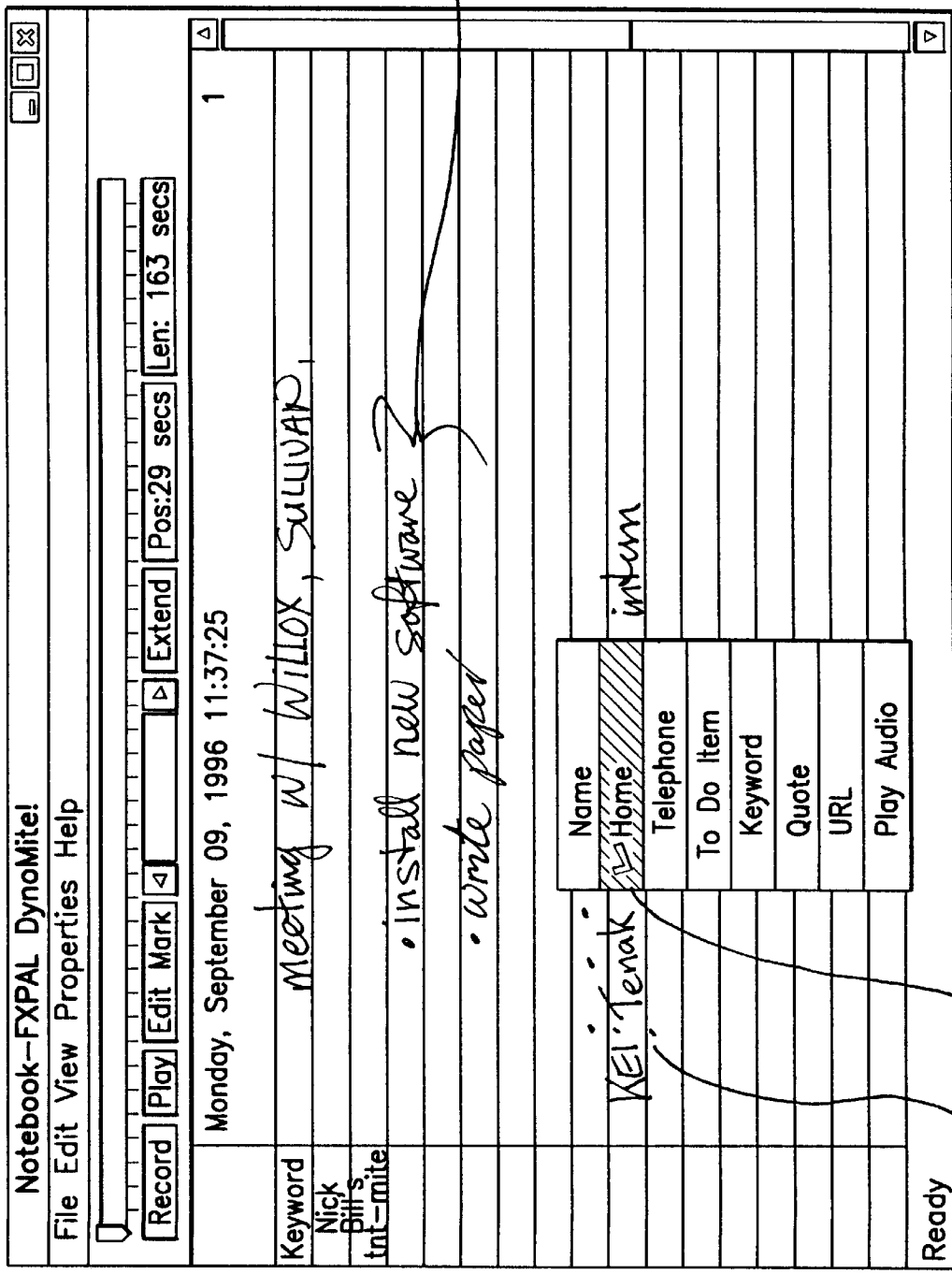
FIG. 3 is an illustration of a sample interface indicating application of a property to digital ink.

FIG. 3 shows the property "name" 38 being added to the digital ink of selected note marks 40. Previously entered note marks 36 with digital ink having the property "action item" are identified with green ink. Another way to assign properties is by using a template in which the digital ink of note marks written in predefined regions is automatically given specific properties. For example, a digital page can be defined with a box for action items, another for URL, etc. or note page can be constructed to have a left-hand margin, and the digital ink of any note marks written in the margin will be assigned the property "name".

In addition to properties, the present invention allows text keywords to be associated with a digital page of note marks. This allows keyword-based retrieval of note marks on digital pages. In contrast to properties, that describe the type of information contained in the note, keywords describe the content of the note. Because keywords reflect more general information, they are assigned to the entire digital page and not to particular note marks. Text keywords 42 are displayed in the margin of the digital page 28 (see FIG. 2), and can be entered in several ways. One, keywords can be selected from a list of previously entered keywords. Two, keywords can be can be typed in using a pop-up keyboard. Three, keywords can be hand-written in a keyword entry box and recognized using a standard handwriting recognition package. Finally, note marks can be selected and sent to a handwriting recognizer, and the resulting text entered as a keyword. If the user does not want to immediately interact with a handwriting recognition package they can associate the "keyword" property with the digital ink to cause delayed recognition.

Figure 4A:
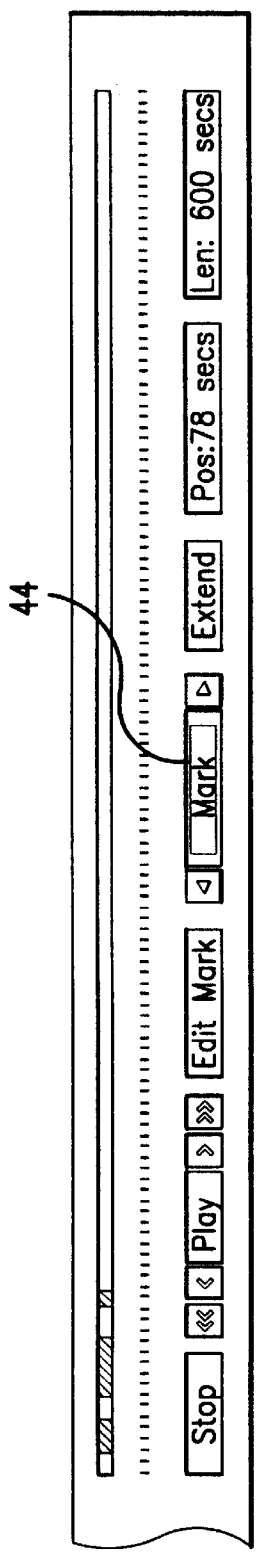
FIGS. 4A–C is an illustration of the audio interface.
Figure 4B:
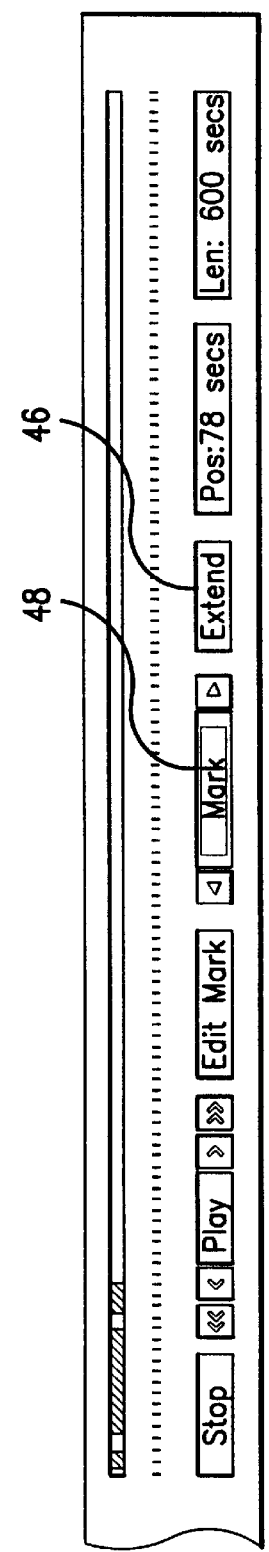

When enabled, audio is recorded continuously and time stamped synchronously with the digital ink of note marks. However, only those portions of the audio highlighted by the user are stored permanently. This reduces the storage space required for the audio data. Audio highlighting is initiated by pressing the "mark" button 44 shown in FIG. 4A or by drawing a highlight gesture. The audio highlighting remains on for a fixed length of time. The user can then press the "extend" button 46 shown in FIG. 4B to extend the length of time the audio is highlighted, or can end the highlighting by pressing the "end mark" button 48.

Audio highlighting is indicated to the user in two ways. First, note marks corresponding to highlighted audio portion are displayed in bold. Second, a horizontal timeline 50 displays a bar spanning the times when the audio has been highlighted. FIG. 2 shows the timeline 36 with thicker strokes 52 that indicate highlighted audio portions.

Audio highlighting can be set so that it is enabled when a specific speaker or speakers are talking. For example, highlighting may always be turned on when the notebook's owner is talking. This is done by using a speaker segmentation algorithm.

When a new digital page of note marks is added to the notebook, only the highlighted audio portions from the previous digital page are placed in permanent storage. Alternately, all audio is stored, but the non-highlighted audio portion is compressed using a low bit rate lasso compression scheme such as LPC. Audio data near a highlighted portion can also be compressed using a higher bit rate than audio data further away from the highlighted portion. This would achieve the goal of reducing storage requirements for audio data, while retaining a poorer quality but intelligible recording of the original audio data.

Figure 4C:
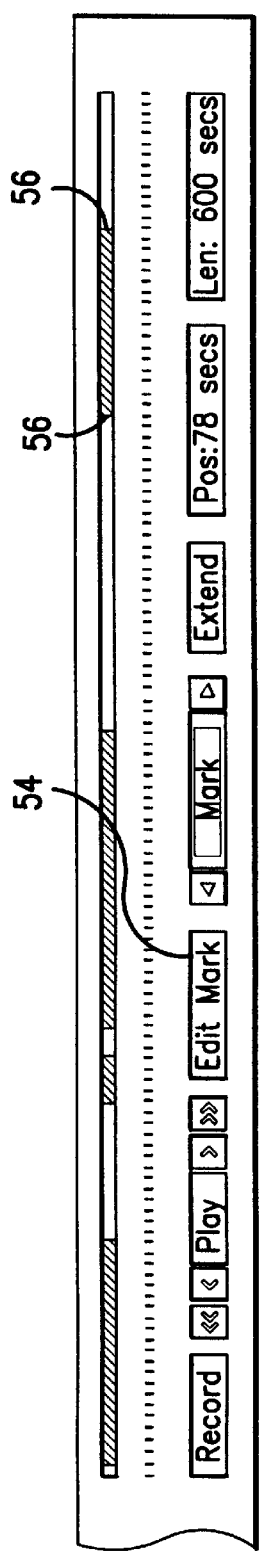

The timeline bar 50 is positioned above the notes 30, showing the highlighted audio portions (FIG. 2). The timeline 50 is also convenient in cases where the user wishes to record audio but does not take notes. The timeline 50 also serves as an interface to modify highlighted portions after recording. The user can listen to highlighted portions and modify the endpoints of the portion by selecting a mark 30, pushing the "edit mark" button 54 shown in FIG. 4C and dragging the end points 56 of the mark 30.

Playback is modified to indicate whether or not the audio has been highlighted. There are several ways of doing this. A first method is to modify the playback volume so that the highlighted portions are louder. Another is to modify the playback rate so that the highlighted portions are slightly slower than normal while all the non-highlighted audio portions are faster than normal. Another method is to add noise to the non-highlighted audio portions to reduce its sound quality. Additionally, reverb can be added to the highlighted audio portions to make them stand out.

When satisfied, the user can store the note marks and highlighted audio portions while the non-highlighted audio portions are either deleted or compressed. Storing only the highlighted audio portions has the advantage of requiring less storage space. Another more subtle advantage is that it serves to decouple the note marks from the recorded audio. For example, if the user is not interested in the topic of discussion corresponding to the current audio and the user wants to refine notes taken previously in the meeting, it is unlikely that the user wants the current audio linked to the current notes. This is achieved by not highlighting the audio.

Pages of the notebook can be viewed sequentially based on the time of creation. Browsing is further supported by providing a window 58 that describes the digital pages in notebook. FIG. 5 shows the browsing window 58 for a series of digital pages. The first column 60 shows the date the digital page was created. The next column 62 shows the date of modification. The series of icons 64 describe properties associated with the digital ink of the note marks in the digital page. For example, the telephone icon 66 represents the property "phone number" and the check box 68 represents the "action item" property. The final column 70 displays keywords 42.

A graphical view (not shown) of the calendar with lists of digital pages displayed at the appropriate times on the calendar may also be provided. A graphical view allows the user to more easily specify the date and time of the particular note page. This is useful for weekly meetings, for example, which the user would quickly find on a calendar because of their regular time and day.

FIG. 6 shows an interface 58 for forming a query. Checks 74 are made in the appropriate boxes 76 for the desired properties and keywords 42 are entered in the keyword box 78.

Using the indexing mechanisms provided by the digital ink properties, time stamping and keywords, the present invention can provide the user with multiple views of data in a notebook. Views are analogous to views in a database system. If a query specifies a particular property, only those note marks having digital ink with that property will be displayed. This view of data consists of newly generated digital pages, each having an original date and containing only those note marks with the specified property.

Figure 7:
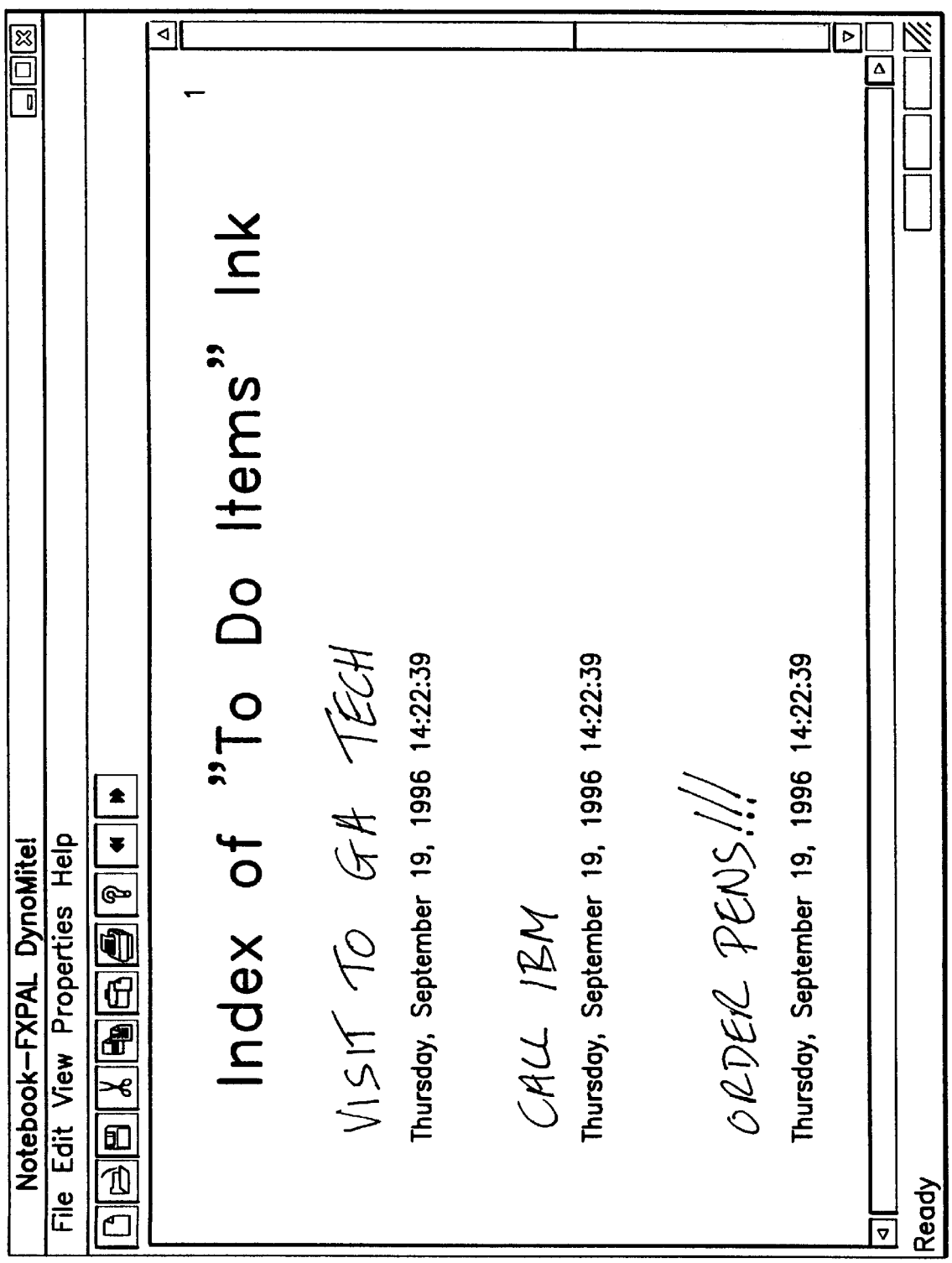
FIG. 7 is an illustration of an index page created from digital ink on multiple note pages having a "To Do" property.

As an example, FIG. 7 shows an index page created by a query that requested note marks having a "To Do" property. Multiple note pages were searched and the results are displayed on the new note page.

The user can also create a view of the notebook by forming a query to request digital pages having specific keywords. The user can define the keywords in the query by browsing an alphabetized list of keywords that have been attached to pages, or by typing or writing the desired keywords. Views are stored as tabs at the bottom of the notebook. A name is associated with each tab for easy reference. The user can return to a previous view by selecting the appropriate tab. The user can decide if the view should be static or dynamic. In the static case, the contents of the view remain the same. In the dynamic case, new items are added to the view as they are entered into the notebook, provided that these items satisfy the terms of the query for this view.

Since keywords recognized by the handwriting recognizer may contain spelling errors, the present invention provides a fuzzy search through a keyword list so that keywords similar to the keyword in a query are retrieved. Here, similarity is based on the known character substitution errors of the handwriting recognizer. Queries can also be restricted to digital pages with a specific date or range of dates. Finally, retrieval queries can be combined, so that the user can specify properties, keywords and dates for a new notebook view.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes will be made without departing from the spirit and scope of the invention as defined in the following claims.

What is claimed is:

1. A digital note-taking system, comprising:
   a pen-based interactive display adapted to receive pen-based input;
   a processor in communication with the pen-based interactive display and responsive to the pen-based input for generating at least one note mark comprising digital ink for display on the pen-based interactive display, wherein the digital ink comprises at least one user defined property that indicates a category of information expressed by the digital ink; and
   a storage device in communication with the processor for storing the digital ink.

2. The digital note-taking system of claim 1, wherein the processor assigns at least one note mark to a digital page, wherein the digital page comprises identifying keywords.

3. The digital note-taking system of claim 1, further comprising:
   an audio input device in communication with the processor and responsive to audio for generating audio data, wherein the processor designates at least one highlighted audio data portion.

4. The digital note-taking system of claim 3, wherein the audio data and the digital ink further comprise time data.

5. The digital note-taking system of claim 3, wherein the storage device stores the at least one highlighted audio data portion.

6. The digital note-taking system of claim 3, wherein the processor is adapted to compress at least one non-highlighted audio portion and wherein the storage device stores the compressed at least one non-highlighted audio portion.

7. The digital note-taking system of claim 3, wherein the pen-based interactive display comprises an audio data time line.

8. The digital note-taking system of claim 7, wherein the audio data time line indicates the at least one highlighted audio data portion.

9. The digital note-taking system of claim 3, wherein the at least one note mark corresponds to the at least one highlighted audio data portion.

10. The digital note-taking system of claim 9, wherein the correspondence of the at least one note mark to the at least one highlighted audio data portion is indicated to the user on the display with thicker line width.

11. The digital note-taking system of claim 1, wherein the at least one property is indicated to the user on the display with a color.

12. The digital note-taking system of claim 1, wherein the at least one property is one of the set comprising: action item, name, calendar item and URL.

13. The digital note-taking system of claim 2, wherein the digital page comprises at least one property specifying region.

14. The digital note-taking system of claim 3, further comprising an audio output device in communication with the processor.

15. The digital note-taking system of claim 14, wherein the processor modifies the at least one highlighted audio data portion for output through the audio output device.

16. The digital note-taking system of claim 3, wherein the processor designates the at least one highlighted audio data portion based upon user input.

17. The digital note-taking system of claim 3, wherein the processor designates the at least one highlighted audio data portion by processing the audio data with a speaker segmentation algorithm.

18. The digital note-taking system of claim 1, wherein the processor is responsive to a user inputted query that identifies a property for searching the storage device and for generating a digital page comprising at least one note mark having digital ink that comprises the identified property.

19. The digital note-taking system of claim 2, wherein the processor is responsive to a user inputted query that identifies a keyword for searching the storage device and for generating a digital page comprising at least one note mark from a digital page that comprises the identified keyword.

20. The digital note-taking system of claim 2, wherein the digital page comprises a background.

21. The digital note-taking system of claim 2, wherein the processor is responsive to a pen-based input comprising a horizontal line gesture to generate a digital page.

22. The digital note-taking system of claim 2, further comprising a browsing window that lists at least one digital page along with the date of creation of the digital page, date of modification of the digital page, at least one icon identifying the property associated with the digital ink on the digital page and at least one keyword associated with the digital page.

23. The digital note-taking system of claim 2, further comprising a query window for generating a query based on at least one of a keyword and property.

* * * * *